United States Patent [19]
Bradford et al.

[11] Patent Number: 5,685,278
[45] Date of Patent: Nov. 11, 1997

[54] FUEL SUPPLY SYSTEM

[75] Inventors: Peter Francis Bradford; Peter John Bartlett, both of Kent, England

[73] Assignee: Lucas Industries, plc, Great Britain

[21] Appl. No.: 683,841

[22] Filed: Jul. 19, 1996

[30] Foreign Application Priority Data

Jul. 21, 1995 [GB] United Kingdom .......... 9514962
Sep. 8, 1995 [GB] United Kingdom .......... 9518414

[51] Int. Cl.[6] ........................... F02M 31/125
[52] U.S. Cl. ........................... 123/514; 123/550
[58] Field of Search ........................... 123/550, 557, 123/514; 210/120

[56] References Cited

U.S. PATENT DOCUMENTS

| | | | |
|---|---|---|---|
| 3,602,206 | 8/1971 | Kern et al. | 123/550 |
| 4,241,873 | 12/1980 | Satomoto | 123/550 |
| 4,574,762 | 3/1986 | Muller et al. | 123/514 |
| 4,625,701 | 12/1986 | Bartlett et al. | 123/514 |
| 4,683,055 | 7/1987 | Bosch et al. | |
| 4,850,327 | 7/1989 | Fayard | 123/514 |
| 5,085,198 | 2/1992 | Bartlett et al. | 123/514 |

FOREIGN PATENT DOCUMENTS

| | | |
|---|---|---|
| 0166160 | 1/1986 | European Pat. Off. |
| 40 13 839 | 8/1991 | Germany. |
| 2 031 994 | 4/1980 | United Kingdom. |

*Primary Examiner*—Marguerite McMahon
*Attorney, Agent, or Firm*—Andrus, Sceales, Starke & Sawall

[57] ABSTRACT

A filter system forming part of the fuel system of a compression ignition engine includes a housing which carries a filter element. The housing has a first inlet which opens into a chamber defined between the housing and chamber the first inlet being connected to a fuel tank, and a first outlet for fuel which has passed through the element and which is connected to a fuel injection pump. The housing has a second inlet which is connected to the chamber and receives heated fuel from the fuel pump and a second outlet which is connected to the chamber through a port. The second outlet is connected to the fuel tank. A third outlet is connected to the second inlet and is connected to a flame type starting aid of the engine. Valve means responsive to the temperature of the fuel in the chamber controls fuel flow through said port.

9 Claims, 3 Drawing Sheets

FUEL SUPPLY SYSTEM

This invention relates to a fuel filter system which forms part of the fuel supply system of a compression ignition engine, the engine being provided with a flame type starting aid system, the filter system including a first inlet which in use receives fuel from a fuel supply tank, a first outlet which is connected in use to the fuel inlet of a fuel pumping apparatus which supplies fuel to the engine and a fuel filter element interposed between the first inlet and the first outlet.

Such fuel filter systems are well known in the art, the filter element incorporating a paper or like medium which retains dirt in the fuel. In cold weather conditions the filter element can be blocked by particles of wax to the extent that the supply of fuel to the apparatus is prevented and it is known to mix hot fuel which is returned from the housing of the pumping apparatus, with the cold fuel flowing through the first inlet thereby to raise the temperature of the cold fuel a sufficient amount to melt or prevent formation of the wax. In hot weather conditions the fuel which is supplied to the pumping apparatus can be too hot leading to excessive leakage of fuel within the pumping apparatus due to the reduced viscosity of the fuel and to other problems.

The object of the present invention is to provide a filter system in a simple and convenient form.

According to the invention a filter system of the kind specified includes a second inlet connected in use to receive the heated fuel leaving the pumping apparatus, a second outlet connected in use to the fuel supply tank, a third outlet for connection to the flame type starting aid system, said third outlet being in constant communication with said second inlet, and fuel temperature responsive valve means for controlling the flow of fuel through said second outlet.

Figure 1:
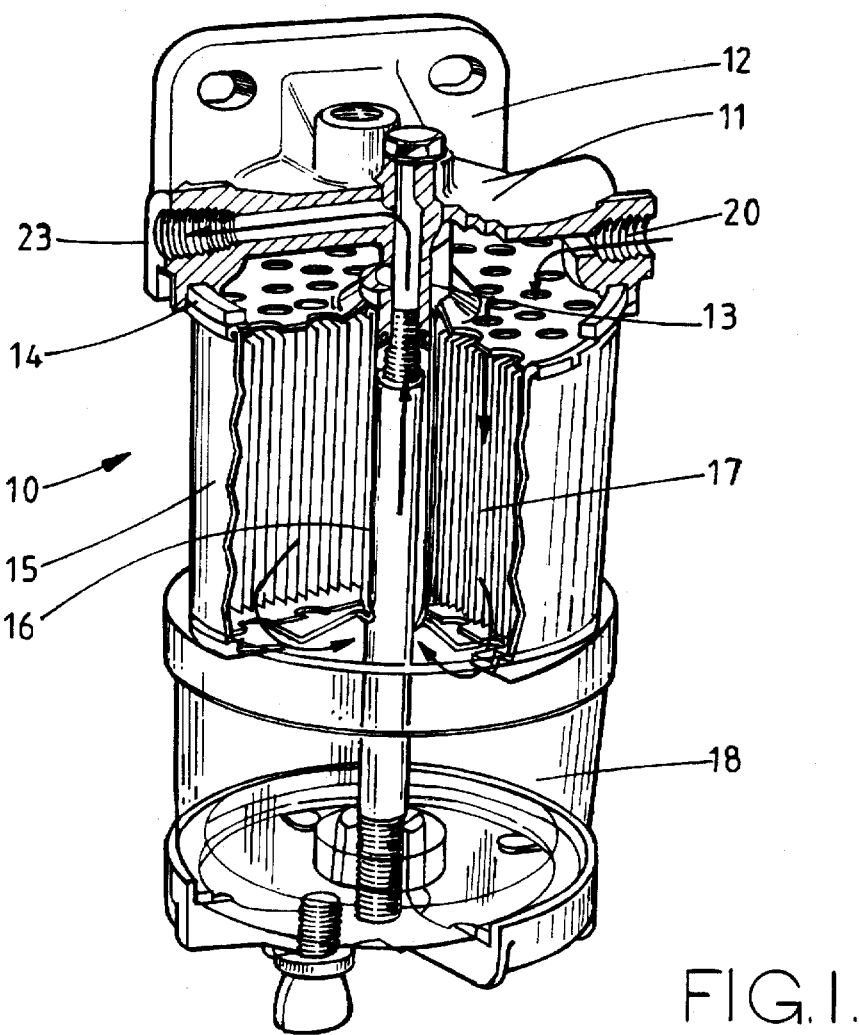
FIG. 1 is a perspective view of part of one example of a filter system.
Figure 3:
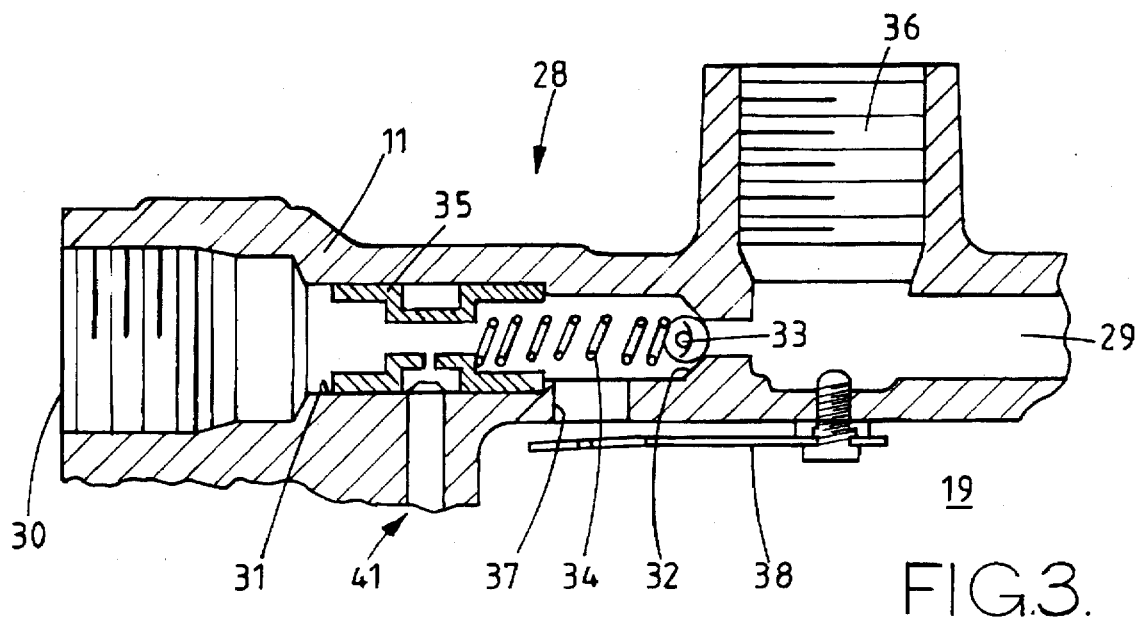
Figure 4:
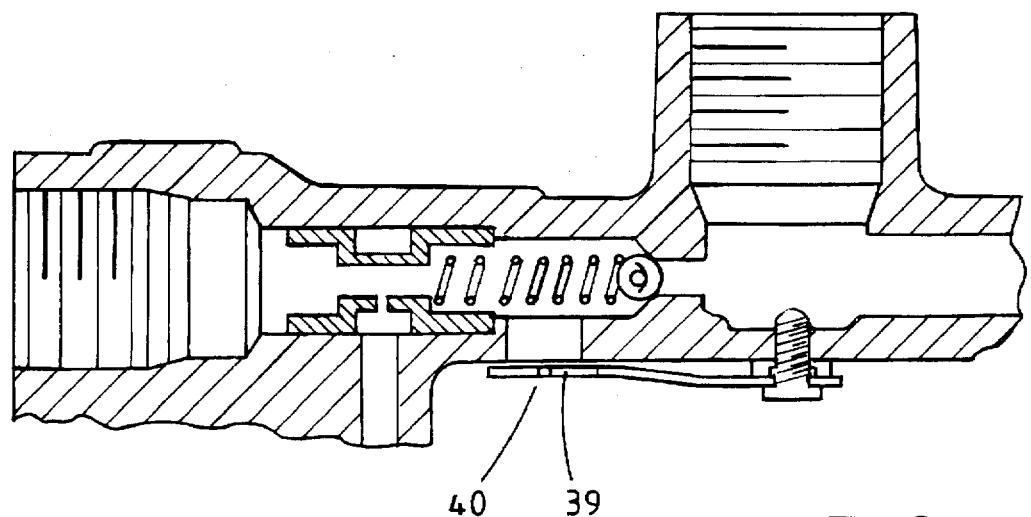
Figure 5:
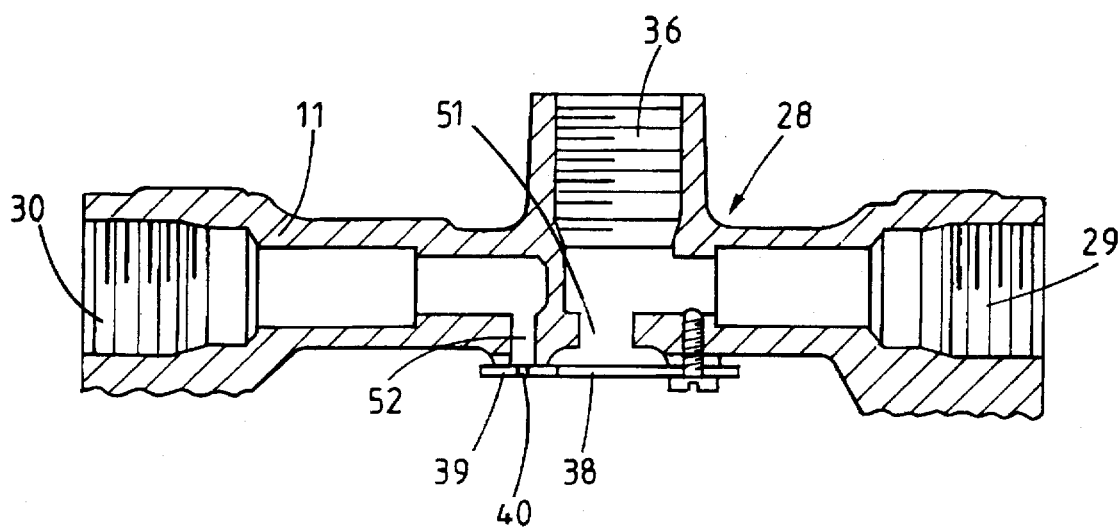
Figure 6:
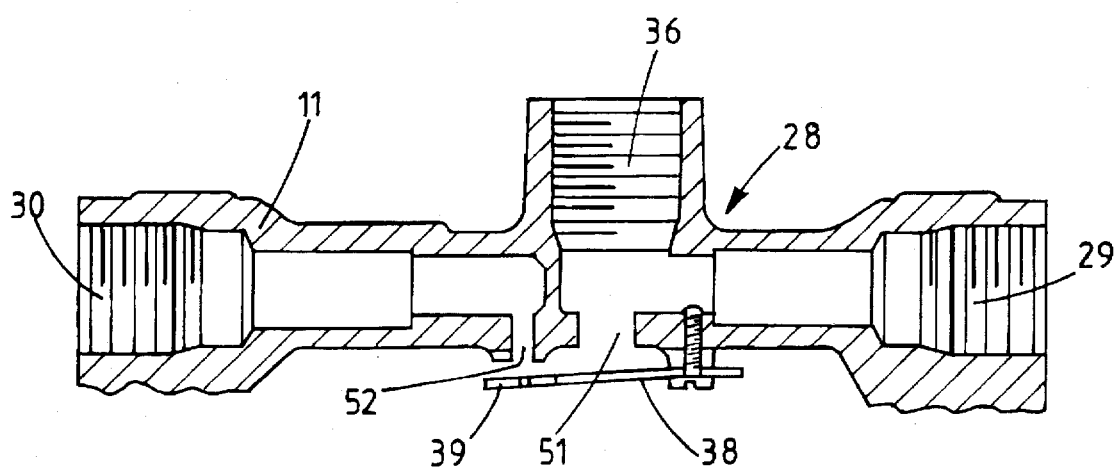

FIGS. 3 and 4 are part sections through a part of the housing of the filter system shown in FIG. 1 showing one example of temperature responsive valve, and FIGS. 5 and 6 are views similar to FIGS. 3 and 4 showing another example of temperature responsive valve.

Referring to FIG. 1 of the drawings the filter system generally shown at 10 includes an upper support housing 11 provided with an integral support flange 12 whereby the system can be mounted on a suitable support surface. The support housing is provided with a hollow depending spigot 13 and it defines an annular recess which accommodates a sealing ring 14 and the upper edge of a filter element casing 15 within which is mounted about a central tube 16, an annular paper filter element 17. The upper and lower ends of the filter element are located between apertured plates respectively. The lower edge of the casing is held in sealing engagement with the rim of a bowl 18 and the bowl together with the casing are held in assembled relationship with the support housing 11 by means of a bolt which extends through the tube 16. The spigot 13 extends into the tube 16 in sealing relationship therewith.

Figure 2:
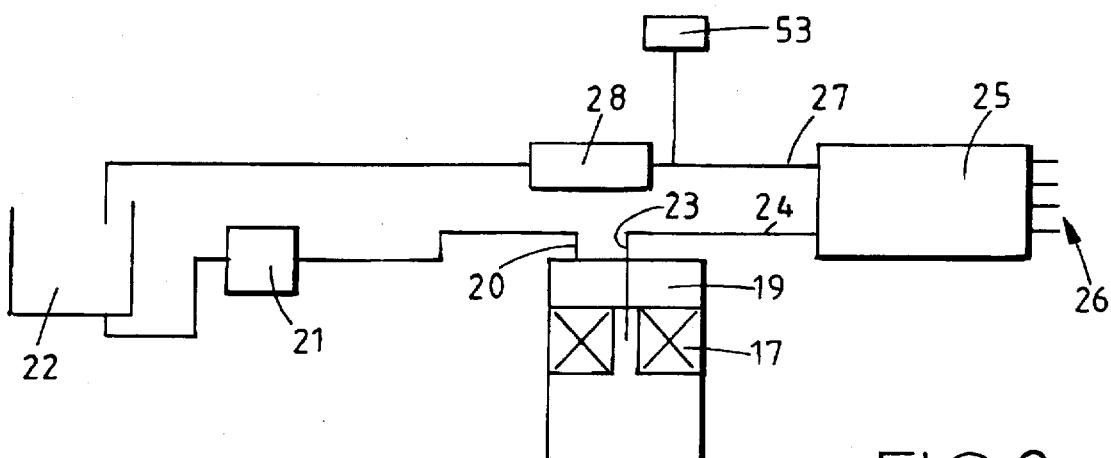
FIG. 2 represents the fuel circuit of the engine fuel supply system.

The support housing defines a chamber 19 more clearly shown in FIG. 2, which communicates with a first inlet 20 and this is connected as shown in FIG. 2, with a lift pump 21 conveniently of the diaphragm type which draws fuel from a fuel supply tank 22. The hollow spigot communicates with a first outlet 23 and this communicates as shown in FIG. 2, with the fuel inlet 24 of a fuel pumping apparatus 25. The pumping apparatus is provided with a plurality of outlets 26 which communicate with the fuel injection nozzles respectively of the associated engine. In use, during operation of the engine the lift pump 21 draws fuel from the fuel supply tank 22 and the fuel flows in the direction shown by the arrows in FIG. 1 that is to say downwardly through the filter element 17 into the bowl 18 and then upwardly through the tube 16 and the spigot to the outlet 23. Any dirt in the fuel is retained by the filter element 17 and water contained in the fuel tends to collect at the bottom of the bowl 18 from which it can be drained as and when required.

The pumping apparatus 25 is provided with an outlet 27 for fuel which collects within the housing of the apparatus due mainly to leakage but possibly due to a deliberate bleed of fuel from the inlet 24. The fuel which leaves the outlet 27 is hot due mainly to the fact that work has been carried out on the fuel within the pumping apparatus. This fuel is returned to the fuel supply tank 22 but a portion of the fuel can be used as will be described, to heat the fuel contained within the chamber 19 to minimise the risk of wax formation or to melt wax which may have already formed in the fuel in cold weather conditions. FIG. 2 shows in outline form a control unit 28 which will now be described with reference to FIGS. 3 and 4. The control unit is incorporated into the support housing 11 of the filter system and includes a second inlet 29 which is connected to the outlet 27 of the fuel pumping apparatus and a second outlet 30 which is connected to a return pipeline leading to the fuel tank 22. The second inlet and the second outlet are interconnected by a passage 31 in which is defined a seating 32 for a ball 33 which is loaded by a spring 34 into engagement with the seating. The spring abutment is in the form of a hollow cylindrical insert 35 located in a wider portion of the passage 31. Adjacent the seating 32 and upstream thereof considered in the direction of fuel flow is a third or auxiliary outlet 36 for connection to the reservoir of a flame type starting aid 53 for the engine and downstream of the seating there is provided a port 37 which connects the passage 31 with the chamber 19.

Within the chamber 19 there is mounted a bi-metallic blade 38 which is connected to an obturating element in the form of a disc 39. The disc 39 is provided with a small aperture 40. In operation, the fuel returning from the fuel pumping apparatus will be supplied initially to the fuel reservoir of the starting aid but when this is full of fuel, the pressure of the fuel lifts the ball 33 from its seating thereby to allow the fuel to flow towards the second outlet 30. The insert 35 is constructed to provide a restriction to the flow of fuel so that some fuel at least will flow through the port 37 into the chamber 19 providing and as shown in FIG. 3, the disc 39 is removed from the port 37 which will be the case when the temperature of the fuel in the chamber 19 is below the operating temperature of the bi-metallic blade 38. Thus when the temperature of the fuel is low a substantial proportion of the hot fuel which is returned from the pumping apparatus will flow into the chamber 19 to mix with the cold fuel supplied by way of the first inlet 20 to the chamber.

As the temperature of the fuel within the chamber 19 increases the bimetallic blade being surrounded by this fuel is heated and moves the disc 39 in a direction to restrict the flow of fuel through the port 37. This movement may take place at a predetermined fuel temperature. In hot ambient conditions the disc 39 will fully close the port 37 although a small quantity of hot fuel will continue to flow into the chamber by way of the orifice 40. The effect is that as the temperature of the fuel within the chamber 19 increases, more and more of the hot fuel leaving the pumping apparatus will flow directly to the fuel supply tank.

There is also shown in FIGS. 3 and 4 a passage 41 which opens into the passage 31 in the region of a channel formed in the insert 35. The latter is provided with a small orifice and the purpose of the passage 41 is to allow air which may collect in the filter system, to flow back to the fuel supply tank.

Referring to FIGS. 5 and 6, the control unit 28 is again incorporated into the support housing 11 of the filter system and includes a second inlet 29 which is connected to the outlet 27 of the fuel pumping apparatus. The control unit 28 further includes a second outlet 30 which is connected to a return pipe line leading to the fuel tank 22. The second inlet 29 communicates with the fuel filter chamber 19 by way of an aperture 51 in the wall of the body of the unit 28 which opens into the chamber 19. The second outlet 30 can communicate with the chamber 19 by way of a port 52 in the wall of the body of the unit 28, the bimetallic blade 38 with its obturating disc 39 cooperating with the port 52 to control opening of the port 52 in relation to the temperature of the fuel flowing over the bimetallic element 38. It will be appreciated that when the port 52 is open then a passage exists, including part of the chamber 19, between the second inlet 29 and the second outlet 30, through which fuel can flow.

Also communicating with the second inlet 29 is a third or auxiliary outlet 36 for connection to the reservoir of the flame type starting aid 53 for the engine.

By contrast with the embodiment disclosed in FIGS. 3 and 4, in the present embodiment when the temperature of fuel in the chamber 19 is below a predetermined level, the bimetallic element 38 straightens to cause the disc 39 to close the port 52. In this configuration fuel return from the injection pump flows through the second inlet 29 and the aperture 51 into the chamber 19. At this stage substantially no fuel flows back through the port 52 to the second outlet 30. Thus fuel from the injection pump is recirculated through the chamber 19 and as this fuel is hot the fuel in the chamber 19 rapidly warms-up.

When the fuel temperature in the chamber 19, in particular the fuel flowing through the aperture 51 over the bimetallic element 38, exceeds a predetermined value, the consequent flexure of the bimetallic element 38 is sufficient to move the disc 39 away from the port 52 to establish communication between the chamber 19 and the outlet 30 through the port 52. This is the position illustrated in FIG. 6 which shows the port 52 fully open for return of hot fuel from the second inlet 29 through the aperture 51, the port 52 and the second outlet 30 to the fuel tank. In order to ensure that the temperature rise within the chamber 19 is controlled it may be desirable to provide some shielding or ducting to guide the flow from the aperture 51 to the open port 52 such that while the port 52 is open there is relatively little mixing of hot returned fuel with the fuel in the chamber 19. In this way the temperature of fuel in the chamber 19 can be maintained sufficiently high to ensure proper fuel flow through the filter, while at the same time minimizing the risk that the fuel flowing through the filter will be overheated.

The disc 39 may be provided with a small aperture 40 which, even in the closed condition of the port 52, will allow a small bleed of hot fuel back through the outlet 30 to the tank. However, the aperture 40 serves a more important function in the closed condition of the port 52 in that it allows air to bleed from the chamber 19 back through the outlet 30 to the tank. The same effect could be achieved by providing a small notch in the wall of the seating of the port 52 so that even when the disc 39 is engaged with the seating of the port 52 air can bleed through the notch in the seat to the outlet 30.

It will be recognised that there is a range of operating temperatures at which the port 52 is partially open, and thus the recirculation of fuel within the chamber 19, or the flow of hot fuel to the outlet 30 is modulated in accordance with the temperature of the bimetallic element 39.

It is desirable that in the fully open position of the port 52 the projected area through which fuel can flow between the disc 39 and the body of the unit 28 is at least double the area of the port 52. In this way there is no risk that the disc 39 will restrict the flow through the port 52 in the open position.

It will be recognised that the construction illustrated in FIGS. 5 and 6 herein is significantly simpler, and thus more economic to manufacture, than the embodiment described with reference to FIGS. 3 and 4. However, notwithstanding its simplicity the same objectives are achieved in relation to control of fuel flow and fuel temperature. The positioning of the bimetallic element 38 in the flow through the aperture 51 ensures that the construction exhibits good temperature sensitivity. Both constructions ensure that the reservoir of the starting aid 53 is recharged with fuel as quickly as possible following starting of the engine.

We claim:

1. A fuel filter system which forms part of the fuel supply system of a compression ignition engine, the engine being provided with a flame type starting aid system, the filter system including a first inlet which in use receives fuel from a fuel supply tank, a first outlet which is connected in use, to a fuel inlet of a fuel pumping apparatus which supplies fuel to the engine and a fuel filter element interposed between the first inlet and the first outlet, a second inlet connected in use to receive heated fuel leaving the pumping apparatus, a second outlet connected in use to the fuel supply tank, a third outlet for connection to the starting aid system, said third outlet being in constant communication with said second inlet and fuel temperature responsive valve means for controlling the flow of fuel through said second outlet.

2. A fuel filter system according to claim 1, in which said inlets and said outlets are formed in a support housing, said filter element is secured to said support housing, a chamber defined between the element and the housing, said first inlet communicating with said chamber, the element receiving the fuel flowing into said chamber, the filtered fuel leaving said element flowing to said first outlet.

3. A fuel filter system according to claim 2, including a passage extending between said second inlet and said second outlet, further valve means defined in said passage, said further valve means opening to permit flow of fuel along said passage from the second inlet when the pressure of fuel in said second inlet attains a predetermined value, a port extending from said passage into said chamber at a position downstream of said further valve means, and said temperature responsive valve means being responsive to the temperature of the fuel in said chamber and acting to control the flow of fuel through said port.

4. A fuel filter system according to claim 3, including a restrictor in said passage downstream of said port.

5. A fuel filter system according to claim 4, in which said further valve means comprises a seating formed in the passage, a ball for engagement with said seating and a spring for biasing the ball into engagement with the seating, said restrictor being defined by an abutment for the spring.

6. A fuel filter system according to claim 5, in which said temperature responsive valve means comprises bi-metallic blade and a disc carried by the blade and movable by the blade to obturate said port.

7. A fuel filter system according to claim 1, including an air bleed passage communicating with said chamber and with said second outlet.

8. A fuel filter system according to claim 2, in which said second inlet opens into said chamber through a first port and said second outlet communicates with said chamber by way of a second port, said temperature responsive valve means controlling flow of fuel through said second port.

9. A fuel filter system according to claim 8, in which said temperature responsive valve means comprises a bi-metallic blade located in said chamber and a disc carried by the blade and movable by the blade to obturate said second part.

* * * * *